United States Patent [19]

Itsumi et al.

[11] Patent Number: 5,307,170
[45] Date of Patent: Apr. 26, 1994

[54] VIDEO CAMERA HAVING A VIBRATING IMAGE-PROCESSING OPERATION

[75] Inventors: Kazuhiro Itsumi, Yokohama; Mamoru Izumi; Mutsumi Watanabe, both of Tokyo, all of Japan

[73] Assignee: Kabushiki Kaisha Toshiba, Kawasaki, Japan

[21] Appl. No.: 784,586

[22] Filed: Oct. 29, 1991

[30] Foreign Application Priority Data

Oct. 29, 1990 [JP] Japan .................................. 2-292574
Sep. 27, 1991 [JP] Japan .................................. 3-249476

[51] Int. Cl.⁵ ............................................ H04N 5/232
[52] U.S. Cl. .................................. 348/219; 354/400; 348/355
[58] Field of Search ................. 358/209, 227, 228, 41, 358/51, 55; 354/430, 401, 402, 403, 404, 400; H04N 5/232

[56] References Cited

U.S. PATENT DOCUMENTS

| | | | |
|---|---|---|---|
| 4,404,594 | 9/1983 | Hannan | 358/209 |
| 4,780,739 | 10/1988 | Kawakami et al. | 354/430 |
| 5,061,954 | 10/1991 | Toyama et al. | 354/402 |
| 5,077,613 | 12/1991 | Hirao et al. | 358/227 |
| 5,086,338 | 2/1992 | Usui | 358/41 |

FOREIGN PATENT DOCUMENTS

| | | | |
|---|---|---|---|
| 3905619 | 8/1989 | Fed. Rep. of Germany | H04N 5/232 |
| 61-136387 | 6/1986 | Japan | H04N 5/30 |
| 61-116313 | 10/1986 | Japan | G02B 7/11 |
| 62-011836 | 1/1987 | Japan | H04N 5/232 |
| 63-056622 | 3/1988 | Japan | H04N 5/232 |
| 63-073213 | 8/1988 | Japan | H04N 5/232 |
| 1-175456 | 7/1989 | Japan | H04N 1/04 |
| 3-143173 | 6/1991 | Japan | |

Primary Examiner—Joseph Mancuso
Assistant Examiner—Tuan V. Ho
Attorney, Agent, or Firm—Oblon, Spivak, McClelland, Maier & Neustadt

[57] ABSTRACT

A video camera includes a vibration generation section including a camera body having a lens system with an auto-focus mechanism, an image pickup element, arranged along an optical axis of the camera body, for picking up an optical image obtained through the lens system, and a piezoelectric actuator for linearly vibrating the image pickup element with a predetermined amplitude at a predetermined period along the direction of the optical axis, an image signal processing circuit for A/D-converting a plurality of images time-serially obtained at arbitrary positions within the amplitude of the image pickup element vibrating along the optical axis, and an image memory for storing the plurality of time-serial images, further including an image input processing section consisting of an in-focus decision/extraction circuit for selecting and extracting clear in-focus areas of a predetermined image area, and an image synthesizing circuit for selecting desired ones of the plurality of areas from the image memory and synthesizing the selected areas into one image. The video camera of this invention further includes an intrusion decision function wherein a time-serial image having small positional and time differences is used within picked image coordinates, an optical flow between these features areas is obtained, and intrusion is decided by using the FOE point from which motion vectors of a stationary object are generated from a motion vector string obtained from the corresponding area in this optical flow.

4 Claims, 8 Drawing Sheets

VIDEO CAMERA HAVING A VIBRATING IMAGE-PROCESSING OPERATION

BACKGROUND OF THE INVENTION

1. Field of the Invention

The present invention relates to a video camera and, more particularly, to a video camera having an improved "auto-focus scheme", capable of obtaining an in-focus image of an object moving at high speed, and having an image-processing function for the in-focus image.

2. Description of the Related Art

Conventional auto-focus schemes for a video camera are mainly classified into an "active scheme" and a "passive scheme" in accordance with whether a search signal serving as a distance measurement reference is output (emitted) or not.

The active scheme emits, e.g., an ultrasonic wave or an infrared ray and receives the wave or ray reflected by an object. To the contrary, the passive scheme determines an object distance in accordance with only a video signal.

In these two types of auto-focus schemes, automatic focusing is performed such that an in-focus decision signal is obtained from any means, and a focusing lens or the like is moved by a motor in accordance with a drive signal corresponding to this decision result.

In such a conventional scheme, a focusing operation is performed after the in-focus state is decided, and the motor speed determines the focusing speed. Therefore, the focusing speed is limited, and an error often occurs in focusing on an object moving at a high speed.

In an image picked up by fixing the focal position after an in-focus state is obtained, it can be kept in the in-focus position within a normal depth of field (i.e. focal depth of image), but is set in a defocus state in a range falling outside the normal depth of field. Therefore, an image focused in a larger depth of field cannot be obtained.

In recent years, the importance of security in a variety of fields has been increasing along with the development of an information-oriented society. As an example, an image surveillance system used to detect an intruder or the like is available. When the number of surveillance areas checked by operators on monitors is increased, the operators who always check the monitors are overloaded, and reliability is degraded. Strong demand, therefore, has arisen for providing an automatic image surveillance system.

When a moving robot is to be designed, a technique for detecting a moving object from instantaneously changing scenes obtained by a moving image pickup system is required. There are recently provided some systems for performing automatic surveillance using TV cameras. In these systems, a still image of an environment is picked up as a background image. Differences between this background image and time-serially obtained images are sequentially obtained, and a total sum of change amounts in a predetermined area is obtained. The total sum is compared with a threshold value to decide "intrusion" within the field of view.

According to this scheme, in an environment where an illuminance varies as in an outdoor condition and a condition under fluorescent illumination, the brightness of the background area is changed due to variations in illumination. For this reason, it is difficult to separate and detect a change caused by an intrusion object, thereby degrading system reliability. According to this scheme, only the presence of an intrusion object is detected. Information representing the direction of movement of the intrusion object cannot be obtained. In addition, when the field of view is always changing as in a moving robot, the background area is also moved. Therefore, intrusion decision cannot be performed by only direct differences.

In order to solve various problems described above, the optical flow in a target area is obtained from a time-serial image, and the background area is separated from the intrusion object on the basis of the optical flow, thereby performing highly reliable detection. Extensive studies have been made for a fundamental technique in this scheme as motion analysis in the fields of computer visions since late 1970.

The techniques conventionally subjected to the above extensive studies are classified into a "gradient-based technique" using spatial and time changes in image densities and a "feature-based technique" for extracting features (characteristics) such as edges from an image and estimating a movement amount from a correlation result between the corresponding features in images having a time difference. The former technique has an advantage in that a movement amount with respect to an image as a whole can be obtained. However, since this technique uses a differential calculation, precision is greatly degraded by noise mixture in an image. In addition, estimated values for a coarse texture area and a boundary object area become inaccurate. The latter scheme has inaccurate movement amounts because feature values are used. However, degradation of precision by noise can be minimized in the latter technique.

In either technique, since time differences and positional differences (the latter differences are typical in the case of moving robot applications) are large using a time-serial image directly obtained by a conventional TV camera, it is difficult to set ranges corresponding to differential calculations and feature values. A highly reliable optical flow cannot be obtained, and almost no practical applications have been made.

As described above, in auto-focus schemes of the conventional image surveillance apparatuses and video cameras, an increase in focusing speed is limited by its structural characteristics, and at the same time an error occurs in an object moving at high speed. In addition, it is difficult to obtain a clear in-focus image in the range from the infinite position to the closest position (i.e., a wide range in the direction of the depth of field) in the entire image pickup area.

When a time-serial image picked up by the conventional image pickup apparatus is used, time and positional differences are large, and a highly reliable optical flow is difficult to obtain.

SUMMARY OF THE INVENTION

It is an object of the present invention to provide an image pickup apparatus such as a video camera capable of increasing a focusing speed and realizing a high-speed auto-focus operation free from operational errors.

It is another object of the present invention to provide a video camera wherein a means for performing an image pickup operation of an image pickup element at an arbitrary position while a lens or the image pickup element is vibrated at a predetermined period in a direction of an optical axis is used, a time-serial image having small time and positional differences is obtained, and a highly reliable optical flow is obtained, thereby providing a highly precise image surveillance function by using the highly reliable optical flow.

The gist of the present invention will be as follows.

Instead of obtaining one image by a "focusing" operation, the image pickup element is always vibrated along the optical axis to perform image pickup operations at a plurality of arbitrary positions (i.e., intermediate positions within the amplitude of the vibration), and at least one image whose focal points are matched is obtained from the plurality of images obtained by the above image pickup operations, thereby extracting and visualizing its clear image.

One of the characteristic features of the video camera according to the present invention lies in that the video camera comprises an image pickup element, having an auto-focus function, for picking up an optical image obtained through a lens system, means for vibrating the lens system or the image pickup element at a predetermined period in a direction of an optical axis, and for causing the image pickup element to perform image pickup operations at a plurality of arbitrary positions, and means for extracting a predetermined image signal from the plurality of image signals of different focal positions obtained by the image pickup element.

The means for extracting the predetermined image signal employs the following techniques:

(1) a technique for extracting an image signal having highest in-focus precision from the plurality of image signals of the different focal positions; and (2) a technique for dividing each of the plurality of image signals into a plurality of areas, performing focus detection in units of divided areas, and extracting divided areas (image signals) corresponding to highest in-focus precision from the areas and synthesizing the extracted areas.

The vibration period of the image pickup element is preferably synchronized with a frame period of an image signal. In addition, a piezoelectric actuator is more preferable as a drive source for driving the image pickup element than a motor.

The video camera according to the present invention is arranged as its application in the following manner.

Another characteristic feature of this video camera lies in that the camera comprises means for picking up an optical image obtained through a lens system, means for vibrating a lens or an image pickup element at a predetermined period in a direction of an optical axis and for causing the image pickup element to perform image pickup operations at arbitrary positions, means for extracting an optical flow from a plurality of images obtained from the image pickup element, and means for detecting a moving object by using the optical flow, wherein time-serial images obtained by linearly vibrating the image pickup element or the lens in the direction of the optical axis are accumulated, an optical flow between the accumulated time-serial images is obtained, and motion vector strings obtained by connecting the corresponding vectors are separated into motion vector strings having FOE (Focus Of Expansion points by the above vibration and motion vector strings without FOE points, thereby detecting an intrusion object.

In the video camera according to the present invention, image pickup operations are performed while the image pickup element is always vibrated along the optical axis. Video signals obtained in the vibrated state of the image pickup element are processed in accordance with a predetermined sequence. Therefore, "high-speed focusing" operations can be performed, and at the same time, an image having a wider focal range from the infinite position to the closest position (i.e., a wide range in the direction of the depth of field of the object) can be obtained.

A practical technique for obtaining the above image signal is as follows.

An image signal is sampled at a plurality of arbitrary points during movement of the image pickup element, and only an image having highest in-focus precision is output and visualized. By using this highly precise image, predetermined image processing is performed while the vibration period of the image pickup element is synchronized with the frame period of the image signal, thereby always obtaining an in-focus motion image. In addition, the technique for processing the sampled images is changed to obtain an in-focus image in the wider range from the infinite position to the closest position.

According to another technique, the vibration period of the image pickup element is synchronized with the frame period of the image signal so that the image reception positions are set identical to each other. Electronic auto-focus control is performed while the image reception positions or its setup are synchronized with the focus signals, thereby always obtaining an in-focus motion image.

In another video camera according to the present invention, images are input while the lens or the image pickup element is vibrated to obtain time-serial images having small time and positional differences. As a result, "correlation search" can be easily performed. The highly precise optical flow can be obtained although this cannot be obtained by images picked up by the conventional image pickup element. In addition, vibration linearity can be precisely controlled, so that precision of FOE measurement can be improved. Therefore, the background can be separated from the motion of the moving object, thereby obtaining a highly precise image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 11A to 11C are views showing a detection state while an intrusion object is moving along a floor (background), in which FIGS. 11A and 11B show images obtained when image pickup positions are rear and front positions.

DETAILED DESCRIPTION OF THE PREFERRED EMBODIMENTS

Figure 1:
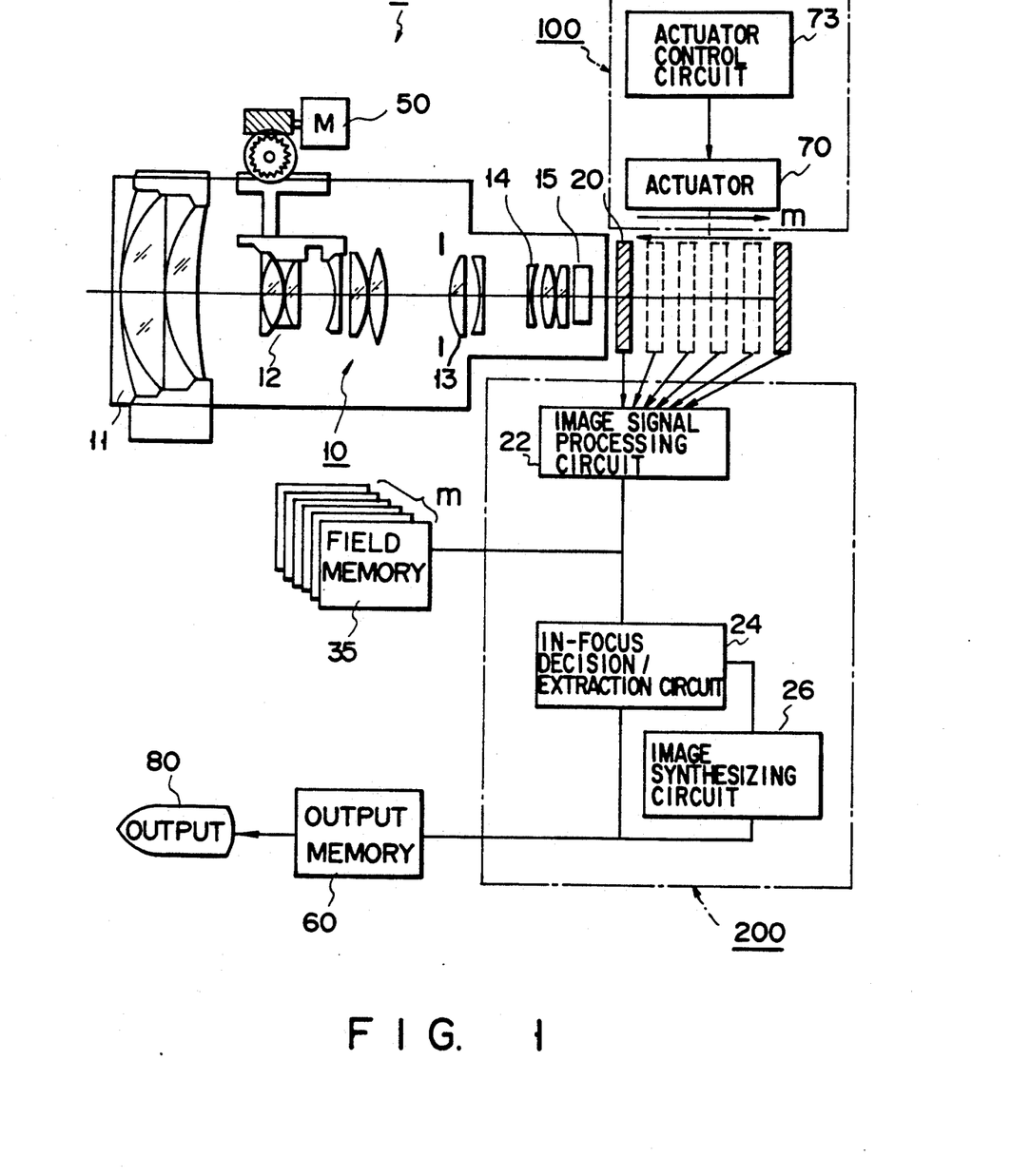
FIG. 1 is a diagram showing a schematic arrangement including a section of the main part of a video camera along a direction of an optical axis according to the first embodiment of the present invention.

In the schematic arrangement of a video camera according to the present invention, as shown in FIG. 1, a lens system 10 comprises a focusing lens 11 which is used in focusing but is not moved in zooming, a zoom lens 12 moved to change the size of an image formed by the focusing lens 11, a focal position correction lens 13 called a "compensator" moved to maintain an image formation position constant, and a relay lens or condenser lens 14. Each of these lenses 11 to 14 comprises a plurality of lenses. The lens system 10 comprise four groups of lenses.

A low-pass filter 15 is located behind the lens system 10. An image pickup element 20 is located behind the low-pass filter 15 to pick up an optical image. Optical information of an object to be photographed or the like is incident on the image pickup element 20 through the lens system 10 and is picked up (photo-electrically) by the image pickup element 20.

The image pickup element 20 is always vibrated with a stroke (amplitude) of about 3 mm in a direction of an optical axis by a vibration generation system 100 including a piezoelectric actuator 70. This stroke value is a value required to perform focusing upon movement of the image pickup element from the infinite position to the closest position of 1 m in an ½" optical system with zooming having a magnification of 6. A position $x\infty$ of the image pickup element 20 corresponding to a distance $\infty$ to the object is assumed to represent a position of the image pickup element closest to the lens system 10. A position x1m of the image pickup element 20 corresponding to a distance of 1m to the object is assumed to represent a position of the image pickup element 20 farthest from the lens system 10. During the operation, the image pickup element 20 is vibrated between the above two points (stroke) to obtain a plurality of image signals.

A plurality of time-serial image signals obtained by the image pickup element 20 are input to an image input system 200 for sequentially processing these plurality of image signals. Each input image signal is input to an image signal processing circuit 22 connected to the image pickup element 20 and is subjected to processing such as A/D conversion. Thereafter, the processed image signal is temporarily stored in an image field (i.e., frame) memory 35 (in the time sequential order). In-focus states of the plurality of converted image signals are detected by an in-focus decision circuit 24 connected to the image signal processing circuit 22 in units of images. The clearest image is selected from the plurality of image signals as a result of this detection. Desired images are partially extracted by, e.g., an image synthesizing circuit 26, as needed, and are synthesized as one image in an output image memory 60 by synthesis processing. The synthesized image is finally displayed and output on a screen 80.

A motor 50 in FIG. 1 constitutes an auto-zoom mechanism for driving the zoom lens 12 through a pinion and a worm gear in the direction of the optical axis to change a focal length.

Figures 2A, 2B, 2C:
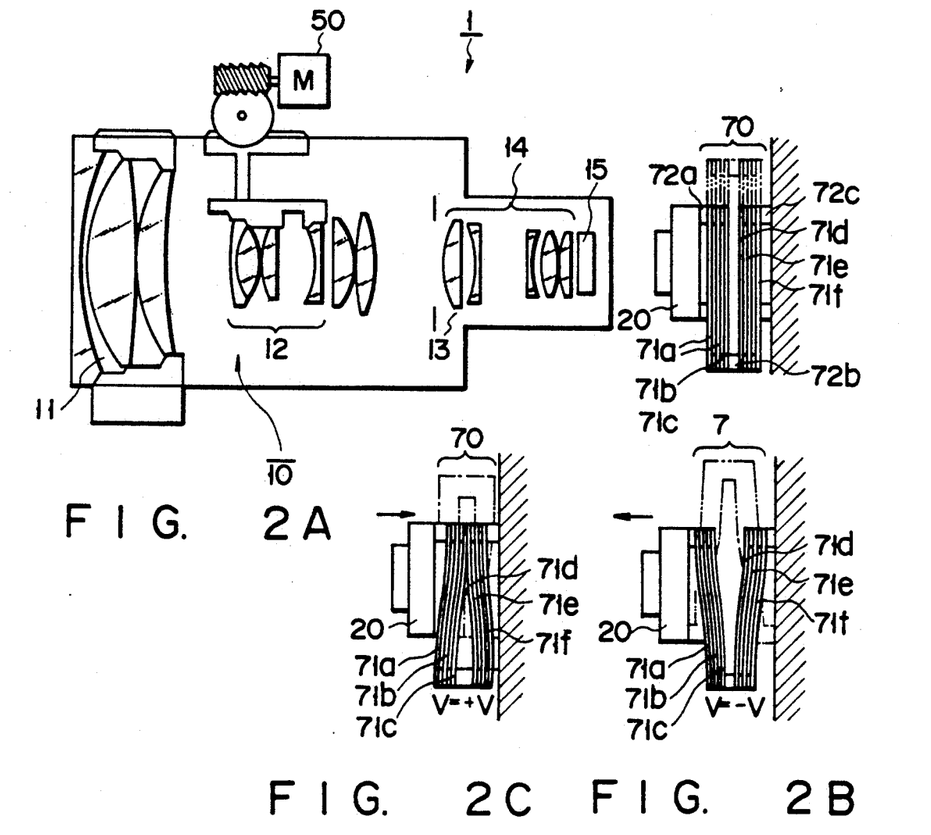
FIGS. 2A to 2C are views showing an arrangement of a video camera body and a piezoelectric actuator used in the first and second embodiments of the present invention.

A normal operating shape of the piezoelectric actuator 70 is shown in FIG. 2A, and deformed shapes during its operations are shown in FIGS. 2B and 2C.

A predetermined control signal having a magnitude falling with the range of qV is applied from an actuator control circuit 73 to the piezoelectric actuator 70 to always vibrate the image pickup element 20 in the direction of the optical axis in FIGS. 2A to 2C. The stroke (vibration) of the piezoelectric actuator 70 is about 3 mm with respect to the object in the range from the infinite position to the closest position of 1 m in the ½" optical system with zooming having a magnification of 6. The image pickup element 20 obtains images of object positions corresponding to positions within this stroke. These image signals are supplied (input) to the image input circuit system 200.

The lens system 10 comprises 4 lens groups consisting of the focusing lens 11, the zoom lens 12, the focal position correction lens 13, and the relay lens 14. The low-pass filter 15 is located behind the lens system 10. An optical image is formed on the image pickup plane of the image pickup element 20 such as a CCD through the lens system 10 and the low-pass filter 15.

The piezoelectric actuator 70 is mounted on the side of the image pickup element 20 opposite to its image pickup plane to move the image pickup element 20 in the direction of the optical axis. The piezoelectric actuator 70 comprise S-shaped driven bimorph elements 71a to 71f. These S-shaped driven bimorph elements are elements driven s that displacement directions of each bimorph element have opposite phases with respect to the center along the longitudinal direction. In the illustrated arrangement, two structures each consisting of three S-shaped driven bimorph elements (71a to 71c or 71d to 71f) connected in series with each other constitute cantilevered bimorph structures. When free ends of these two cantilevered bimorph are connected, the displacement is increased and the mechanical characteristics are improved.

Another pair of cantilevered bimorph structures are prepared as in the bimorph elements 71a to 71f, as indicated by the alternate long and two short dashed lines, thereby further improving the mechanical characteristics.

Figure 3:
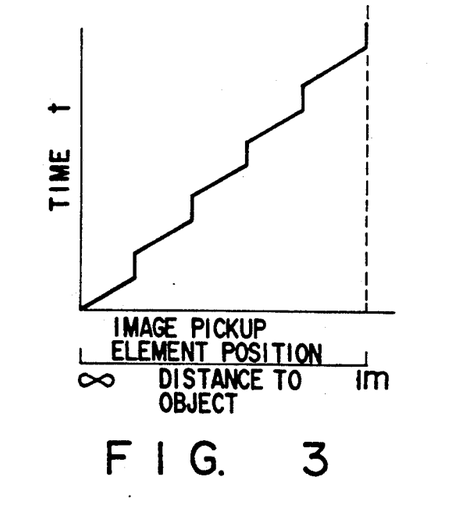
FIG. 3 is a graph showing a relationship between the position and time of an image pickup element of the video camera described above and the distance to an object.

A graph in FIG. 3 shows an operation of a "high-speed focusing" operation. Axial movement of the image pickup element 20 is represented by a polygonal line. The position x of the image pickup element (range:

infinite to 1 m) is plotted along the abscissa of this graph, and time t (required to obtain an in-focus state) is plotted along the ordinate. A plurality of images corresponding to a plurality of arbitrary positions are sampled within the movement range of the image pickup element 20. In this embodiment, the image pickup element 20 performs sampling several times (5 times in this embodiment). Driving of the image pickup element 20 by the movement actuator is set so that the image pickup element is stopped for a sampling (predetermined) time or more. Note that if the sampling (predetermined) time is sufficiently shorter than the movement time of the image pickup element 20, the stop time need not be provided.

Figure 4A:
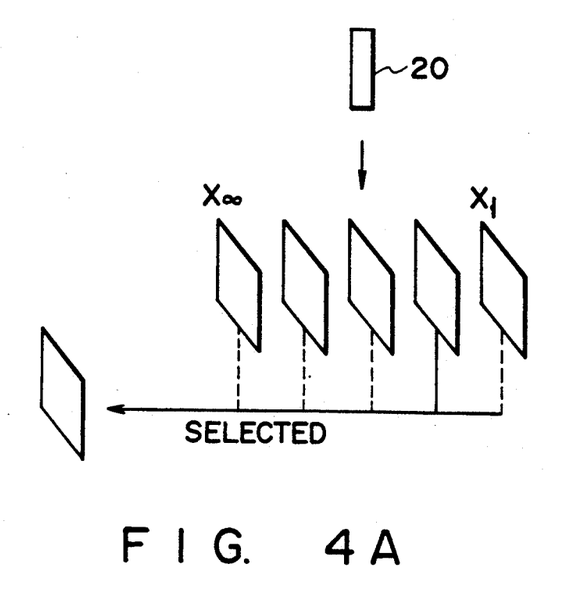
FIGS. 4A and 4B are views showing states of image extraction in the first embodiment.

As shown in FIG. 4A, a plurality (five in this embodiment) of images are obtained during sampling between $x\infty$ to xlm. High-frequency components of the image signals of these images are extracted and integrated to detect "focal point evaluation values" for detecting the degrees of focusing (i.e., focusing precision: in-focus precision). Comparison is performed in units of images. Of these images, one image having highest in-focus precision is selected and is output as an image. More specifically, the vibration period of the image pickup element 20 is synchronized with the frame period of the image signal. For example, in the NTSC (National Television System Committee) scheme, when a moving speed between $x\infty$ and xlm is set to be $1/30 \times \frac{1}{2}$=sec., one reciprocal stroke (i.e., one period of the vibration) corresponds to one frame in the NTSC scheme. As a result, a motion image is always obtained in an in-focus state.

A video camera as an imaging apparatus suitable for an application in which an in-focus image is obtained on the entire screen if so desired further comprises the image synthesizing circuit 26 for performing image synthesis processing.

Figure 4B:
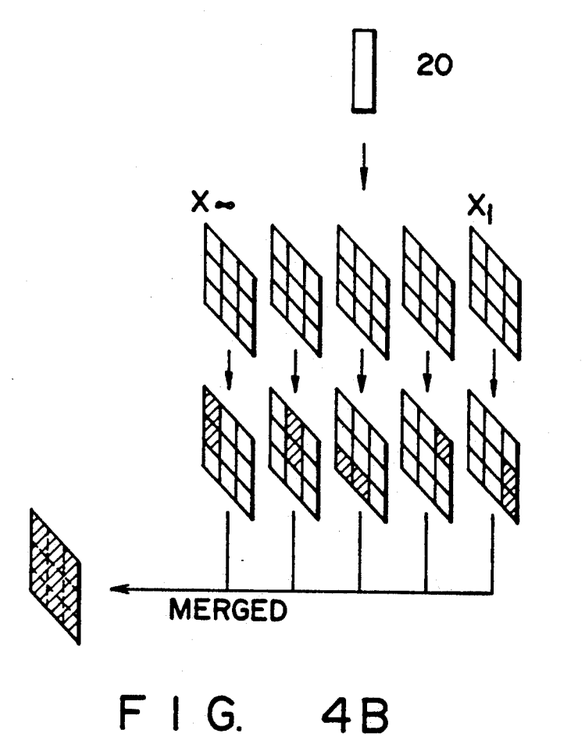

More specifically, during each movement cycle between $x\infty$ and xlm, the image synthesizing circuit 26 divides each sampling image into a plurality of areas, as shown in FIG. 4B, and focus detection is performed in units of divided areas. During one movement cycle between $x\infty$ and xlm, only in-focus areas are extracted from the memory 35 to synthesize them into one image. Therefore, an image (e.g., a motion image) having an extremely large depth of field, i.e., an in-focus image in the entire range from the infinite position to the closest position can be obtained.

In place of the above "extraction and synthesis technique", "filtering processing" for filtering a blur portion in each image or an "omission and synthesis technique" for omitting blur portions of the images and synthesizing the resultant images may be employed.

Another arrangement of "high-speed focusing" operation will be described below. As in the previous embodiment, the image pickup element 20 is vibrated in synchronism with the frame period of the image signal. The reception time of the image signal forming one frame is set sufficiently shorter than the vibration period, and only image signals at given focal positions within the vibration range are read. Since the vibration period coincides with the frame period, the read position can be electronically and arbitrarily controlled. A focal point evaluation value is detected from the read image signal, and the read position is fed back, thereby performing auto-focus processing. Since the auto-focus feedback system ca be constituted by only electronic circuits, in-focus motion images can always be obtained.

The image signals obtained during movement between two points falling within the range of $x\infty$ and xlm are received and displayed. For example, when a display-operation is performed every 30 frames/sec as in the NTSC scheme, an image is obtained such that images overlap from an image of the closest position to an image of the infinite position. More specifically, when signals are sequentially displayed on the same pixel (picture element) every 1/30 sec., the obtained image of an object moving from a close point to an infinite point appears to be in focus due to a residual image effect. Although image quality is slightly degraded, this scheme can provide an in-focus image in a wide range from the infinite position to the closest position. Therefore, a clear object having a high contrast level can be sufficiently recognized. A better image can be obtained when image processing is performed.

The above description exemplifies a technique for obtaining an in-focus image within a field. The image pickup element 20 need not be operated at very high speed (e.g., vibration in this case), and any scheme may be employed if an appropriate in-focus image is obtained by simpler processing.

In the foregoing description of this embodiment, the image pickup element 20 is vibrated. However, the same effect as the above embodiment can be obtained even if a lens system such as a focus control lens (correction lens 13) is similarly driven. The means for vibrating the image pickup element 20 or the lens system 10 is not limited to the piezoelectric actuator 70, but may be replaced with another means such as a voice coil motor.

Various changes and modifications may be made without departing from the spirit and scope of the present invention.

The above embodiment according to the present invention can cope with an object or the like which is moving at high speed in a wider range of the depth of field, which operation has not been made by a conventional video camera with an auto-focus mechanism. There is therefore realized a video camera having a high focusing speed capable of obtaining an in-focus image at a higher speed in accordance with predetermined image processing.

Figure 5:
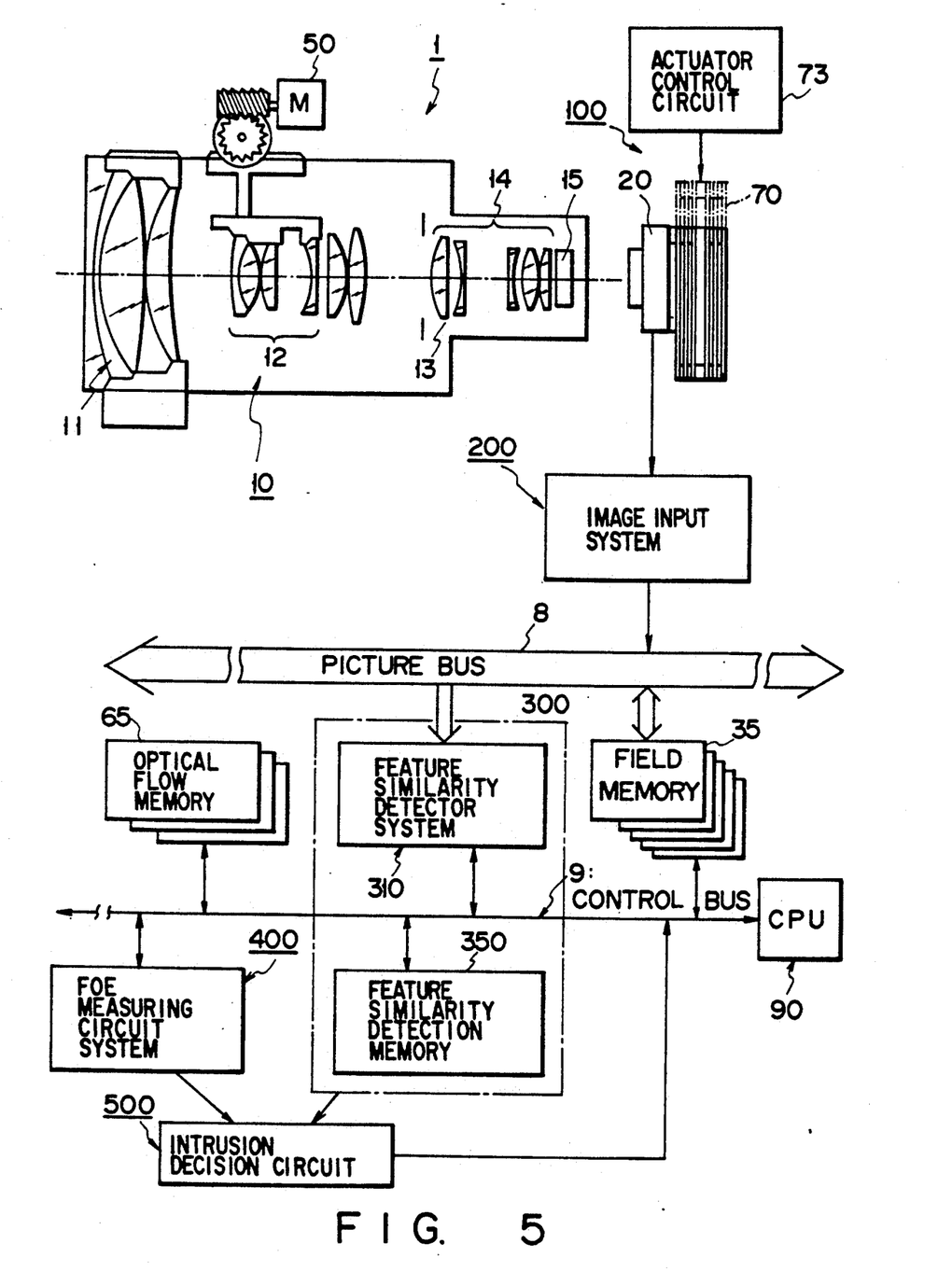
FIG. 5 is a block diagram showing an overall arrangement of an image surveillance apparatus using the video camera of the second embodiment of the present invention.

A video camera body 1 shown in FIG. 5 is combined with the vibration generation system and is used in an image surveillance apparatus such as an intrusion surveillance camera according to the second embodiment of the present invention. For example, image surveillance apparatuses are applied to intrusion detection in department stores and offices and obstacle detection in moving robots.

This embodiment aims at providing an image surveillance video camera which utilizes the gist of the present invention that "a lens or image pickup element of a camera or the like is vibrated at a predetermined period in a direction of an optical axis to input instantaneous images, thereby acquiring time-serial images having small time and positional differences". More specifically, by obtaining a highly reliable "optical flow" coping with an object moving at high speed which cannot be captured by zooming in an image of a conventional image pickup apparatus such as a video camera, the background can be separated from motion of the moving object in an image, thereby providing an image surveillance apparatus for easily obtaining a high-quality (i.e., in-focus) image.

Referring to FIG. 5, the video camera body 1 is a combination of an image pickup element 20 and a vibration generation system 100 for moving the element itself or part or all of a lens system 10 with a predetermined amplitude at a predetermined period in the direction of the optical axis. This vibration generation system 100 comprises a piezoelectric actuator 70, an actuator control circuit 73, and a drive circuit (not shown). An image output corresponding to a half cycle of the vibration period is sequentially transferred to an image input system 200 connected to the image pickup element 20. The image input system 200 performs predetermined image processing (details will be described with reference to FIG. 6) such as digital conversion of the image output. The processed image output is stored in an image memory 35 (in units of time-serial signals) through an image information bus 8.

On the other hand, an optical flow detector system 300, an FOE measuring circuit system 400, an intrusion decision circuit 500, and an optical flow memory 65, all of which are associated with surveillance processing (to be described in detail later) are connected in parallel with a control bus 9 connected to a CPU 90 for controlling the overall operation of the apparatus.

The optical flow detector system 300 connected to the control bus 9 and the image bus 8 obtains "motion" associated with a corresponding area from a plurality of time-serial images prestored in the image memory 35 in accordance with predetermined analysis processing and detects an "optical flow" of this area. An FOE detector 4 analyzes the "motions" of the background and the object to measure an FOE (Focus Of Expansion) point where the optical flow of the stationary object obtained upon movement of an image pickup plane along the direction of the optical axis is generated. The intrusion decision circuit 500 decides whether the optical flow contains components which are not generated from the FOE point, thereby detecting "intrusion" of, e.g., an object moving into the field of view of the intrusion surveillance camera.

Arrangements of the respective blocks in FIG. 5 will be described below.

Figure 6:
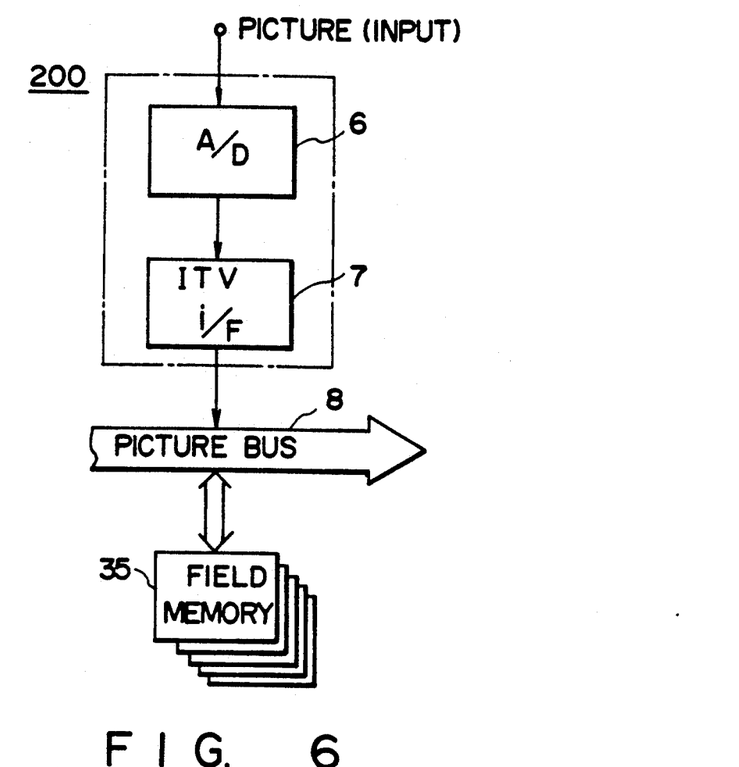
FIG. 6 is a diagram showing an arrangement of an image input circuit system.

FIG. 6 shows the image input system 200 and the associated image memory (field memories) 35 connected thereto through the image bus 8.

The arrangement of the image input system 200 will be as follows.

An image signal output from the camera body 1 is converted into a digital signal by an A/D converter 6. The digital signal is stored in the image memory 35 through an ITV interface 7 and the image bus 8. The image memory (e.g., field memories) 35 is also connected to the control bus 9, so that random read/write access can be performed. By using the image input system 200, a plurality of images (i.e., time-serial images) of a half cycle (i.e., a forward stroke of the image pickup plane position toward the lenses) of the vibration period are sequentially stored in the field memories 35.

Figure 7:
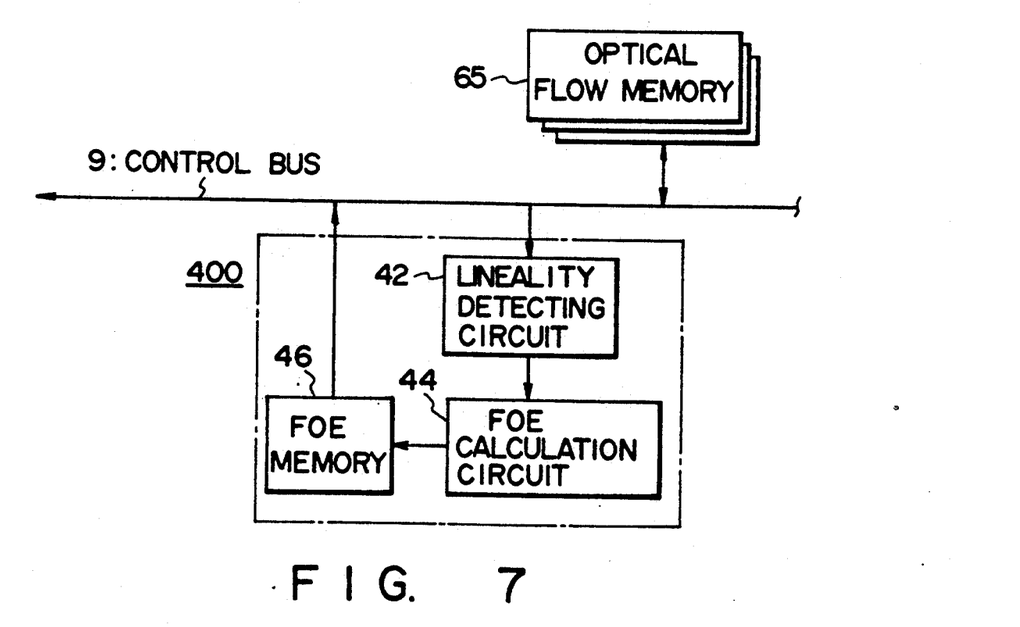
FIG. 7 is a diagram showing an arrangement of an FOE measuring circuit system.

FIG. 7 shows an arrangement of the FOE measuring circuit system 400.

Figure 10:
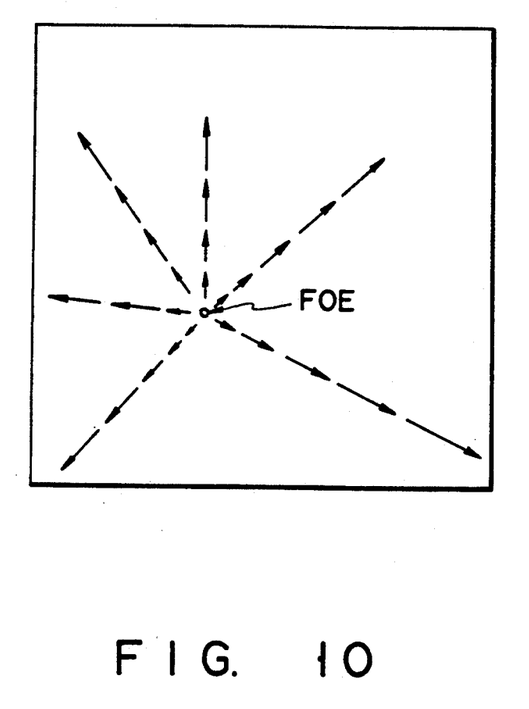
FIG. 10 is a view showing a relationship between the "optical flow" of a stationary object and the FOE.

As illustrated in FIG. 10, the optical flow of the stationary object obtained upon movement of the image pickup plane in the direction of the optical image is a flow generated from one point. This point is called the FOE. By using this finding, the optical flow of the stationary environment is obtained in advance, and a line detecting circuit 42 obtains linear expressions from "motion vector strings" obtained by connecting the corresponding areas. These linear expressions can be derived using the method of least squares method. An FOE calculation circuit 44 obtains intersections of the respective lines to calculate FOE coordinates. For example, if three or more straight lines (e.g., segments) are obtained, the center of gravity of these intersections is set as the FOE point (position). The FOE coordinates are stored in an FOE memory 46.

Figure 8:
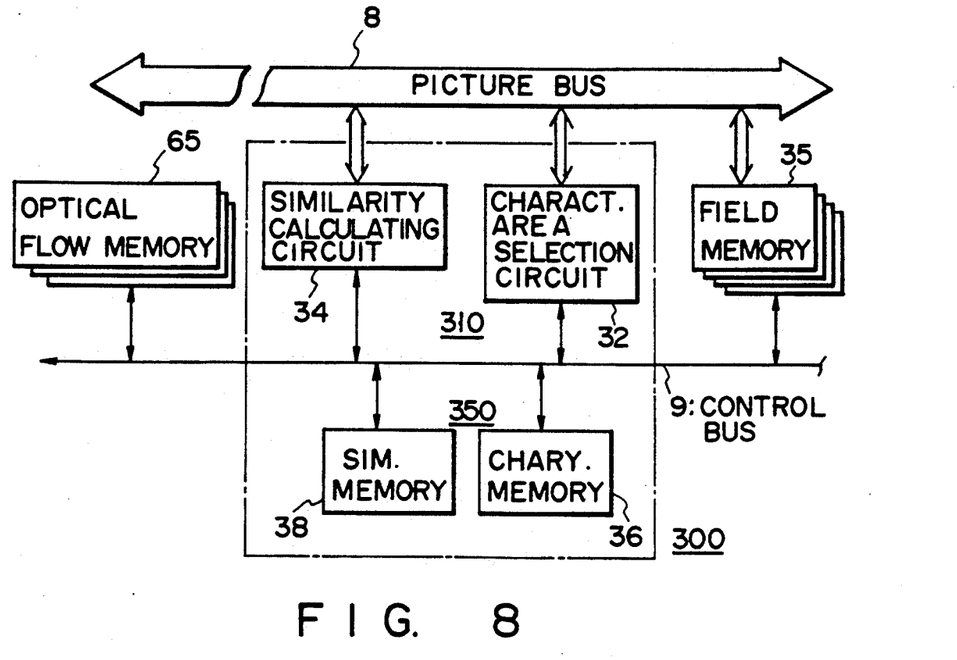
FIG. 8 is a diagram showing an arrangement of an optical flow detector system having a feature similarly (area) detector and a feature similarity memory.

FIG. 8 shows an arrangement of the optical flow detector system 300.

The following processing will be performed to analyze image features, similarity points between a plurality of images, and the like.

Images of two consecutive moments are sequentially selected from the time-serial images stored in the field memories 35. A characteristic area selection circuit 32 selects a target area for calculating motion vectors from the image of the previous moment (i.e., the image located behind the image pickup plane). Parameters such as an area size and a maximum area count are prestored in a characteristic memory 36. Character (feature) area decision processing is realized by calculating a "variance value" inside the area and selecting an area having a value larger than a predetermined threshold value supplied to the characteristic memory 36. A similarity calculating circuit 34 searches the image of the next moment (i.e., the image located in front of the image pickup plane) and selects an area having most similar "density characteristics" in the respective characteristic areas. The range of search is preset in a similarity memory 38. In practice, however, the range of search may be limited to a very narrow range because differences in image positions are very small values. As a result, reliability can be improved and the processing time can be shortened. A difference vector between the central positions of these two areas is sequentially stored as a motion vector in an optical flow memory 65.

A similarity representing a degree of similarity between two images is calculated by equation (1) as follows:

$$\frac{\Sigma(I(t)_{ij} - I(t-1)_{ij})^2}{\Sigma I(t)_{ij} \cdot \Sigma I(t-1)_{ij}} \qquad (1)$$

where

Figure 9:
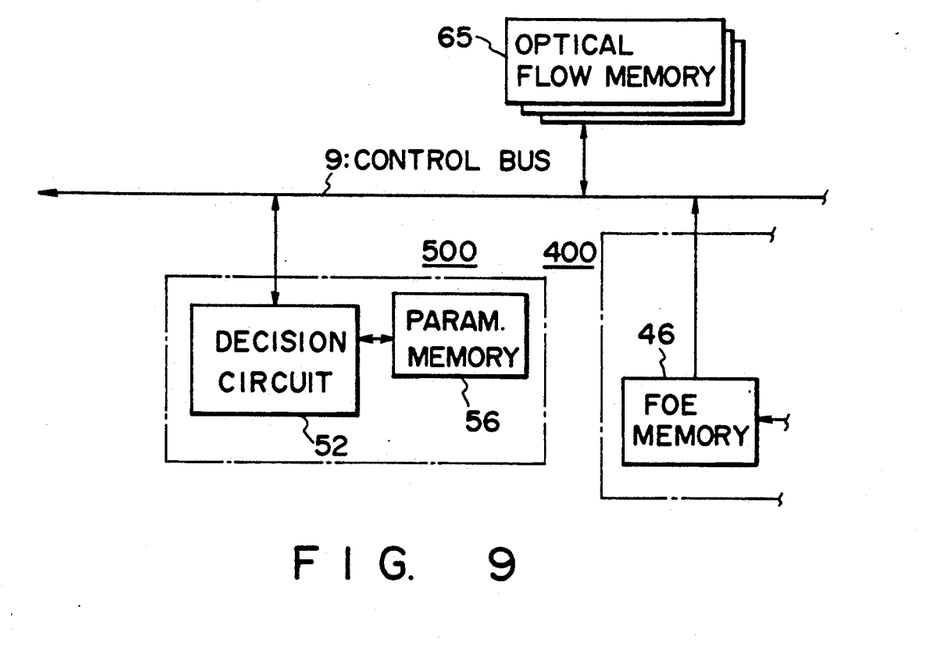
FIG. 9 is a diagram showing an arrangement of an intrusion decision circuit.

I(t−1)$_{ij}$: brightness of a pixel at a position (i,j) of an image at the previous moment I(t)$_{ij}$: brightness of a pixel at the position (i,j) of an image at the next moment Σ: total sum within the characteristic area FIG. 9 shows an arrangement of the intrusion decision circuit 500. A linear expression is applied by the line detecting circuit 42 from a motion vector string obtained by connecting the corresponding areas. A decision circuit 52 decides whether this line passes through the FOE point stored in the FOE memory 46, thereby calculating the number of lines (segments) not passing through the FOE point. This decision processing is performed by comparing a predetermined threshold value preset in a parameter memory 56 with the number of lines not passing through the FOE point.

As illustrated in FIG. 10, the optical flow of the stationary object obtained upon movement of the image pickup plane in the direction of the optical image forms a "flow" in which line segments indicated by arrows and generated from the FOE point are linearly continuous.

Figure 11A:
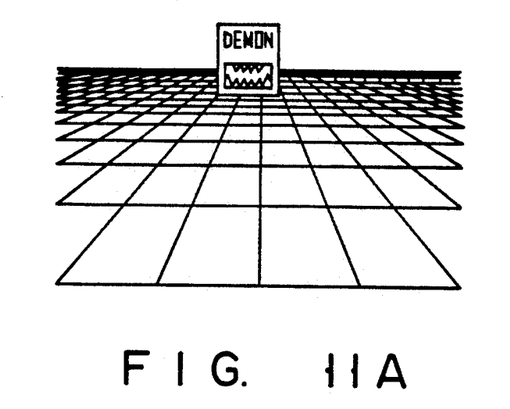
Figure 11B:
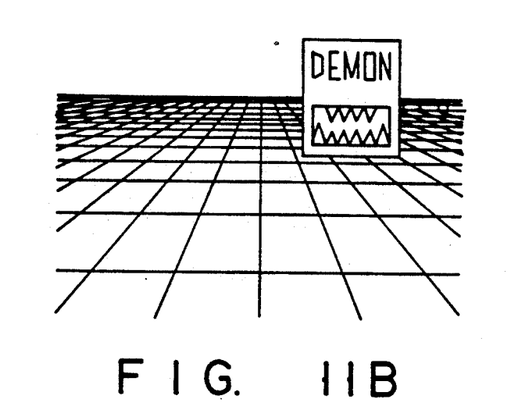
Figure 11C:
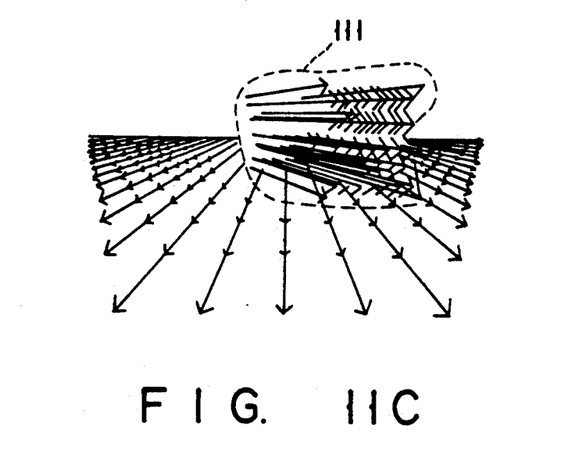
FIG. 11C shows motion vectors obtained by connecting areas corresponding to the extracted "optical flow".

FIGS. 11A to 11C show detection states in which an intrusion object moves along a floor (background). FIGS. 11A and 11B show images obtained when image pickup positions are rear and front positions, and FIG. 11C shows motion vectors obtained by connecting areas corresponding to the extracted optical flow.

The motion vector string of the floor stationary relative to the environment is represented by straight lines radially generated from one point (FOE). To the contrary, the motion vector string of the moving object has a unique "start point" different from the FOE point, as indicated by reference numeral 111 surrounded by a broken line in FIG. 11C. Generation of this point can be easily detected by using the intrusion decision circuit system 500.

The video camera as the image surveillance apparatus having the above arrangement can be used in a variety of applications.

The present invention is not limited to the particular embodiment described above. In the above embodiment, the image pickup element 20 is vibrated. The lens system 10 may be vibrated in place of the image pickup element as in the first embodiment to obtain the same effect as in the second embodiment.

The present invention is applicable as a modification to a system including an image apparatus having a moving field of view as in a moving robot in addition to an arrangement in which the field of view is stationary and the image pickup plane vibrates, if the moving direction is regarded as a linear direction. In this modification, a point for generating a motion vector string of the background area is not an FOE point generated by the vibration of the image pickup plane, but an FOE position obtained upon vibration of the image pickup plane in a third direction obtained by synthesizing the moving direction of the moving robot and the vibration of the image pickup plane. If the vibration speed is sufficiently higher than the speed of the moving robot, the FOE position almost coincides with the FOE point generated by only vibration of the image pickup plane.

In addition, when the motion vector string of the intrusion object is analyzed, its moving direction can be detected.

Various changes and modifications may be made without departing from the spirit and scope of the invention.

A highly reliable optical flow is obtained from time-serial images having small time and positional differences obtained upon vibration of a lens or image pickup element at a predetermined period in a direction of an optical axis, and image processing is performed to separate the movement of the background from that of the moving object by using the optical flow, thereby obtaining a high-quality image. By changing a sampling image processing technique in image processing in accordance with a application purpose, in-focus motion images throughout the entire range from the infinite position to the closest position can be picked up. For example, the present invention can be applied to a variety of applications such as an image surveillance apparatus (e.g., an intrusion surveillance camera) which always requires in-focus images.

In addition, intrusion detection can be performed while the field of view is always moving as in a moving robot, which detection cannot be performed by conventional direct differences. That is, by analyzing the motion vector string of the intrusion object to detect the moving direction, actions such as a collision preventive action and an emergency stop in operations of the robot can be appropriately selected, thus providing a variety of applications and advantageous effects.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A video camera comprising:
   an image pickup element for receiving optical information of an object to be photographed after the optical information passes through a lens system, and performing an image pickup operation;
   vibration generating means, coupled to said image pickup element, for applying a vibration to said image pickup element with a predetermined stroke (amplitude) in the direction of the optical axis;
   sampling means for extracting image signals at predetermined time intervals from a plurality of image signals of different focal positions obtained from said image pickup element at a plurality of arbitrary positions within the stroke;
   image memory means for time-serially storing sampling images acquired from said image pickup element; and
   in-focus decision extracting means for extracting a high-frequency component from an image signal of the sampling image, detecting a focal point evaluation value for evaluating a degree of focusing upon integrating processing, comparing the focal point evaluation values of the plurality of images, and selecting a sampling image having a largest focusing precision value.

2. A video camera comprising:
   an image pickup element for receiving optical information of an object to be photographed after the optical information passes through a lens system, and performing an image pickup operation;
   vibration generating means, coupled to said image pickup element, for applying a vibration to said image pickup element with a predetermined stroke (amplitude) in the direction of the optical axis;
   sampling means for extracting image signals at predetermined time intervals from a plurality of image signals of different focal positions obtained from said image pickup element at a plurality of arbitrary positions within the stroke;
   image memory means for time-serially storing sampling images acquired from said image pickup element;
   in-focus decision extracting means for extracting a high-frequency component from an image signal of the sampling image, detecting a focal point evaluation value for evaluating a degree of focusing upon integrating processing, comparing the focal point evaluation values of the plurality of images, and selecting a sampling image having a largest focusing precision value; and
   image synthesizing means for dividing the sampling image into a plurality of areas as needed, performing focus detection in each divided area, and extracting only in-focus areas from said image memory means to synthesize the in-focus areas into a single image.

3. A video camera comprising:

an image pickup element for receiving optical information of an object to be photographed after the optical information passes through a lens system, and performing an image pickup operation;

vibration generating means, coupled to said image pickup element, for applying a vibration to said image pickup element with a predetermined stroke (amplitude) in the direction of the optical axis, wherein said vibration generating means comprises:

a vibration drive source, coupled to said lens system or said image pickup element, for applying a vibration drive force to one of said lens system and said image pickup element, and vibration source control means for applying a predetermined control signal to said vibration drive source to generate a vibration at a predetermined period;

sampling means for extracting image signals at predetermined time intervals rom a plurality of image signals of different focal positions obtained from said image pickup element at a plurality of arbitrary positions within the stroke;

image memory means for time-serially storing sampling images acquired from said image pickup element; and in-focus decision extracting means for extracting a high-frequency component from an image signal of the sampling image, detecting a focal point evaluation value for evaluating a degree of focusing upon integrating processing, comparing the focal point evaluation values of the plurality of images, and selecting a sampling image having a largest focusing precision value.

4. A video camera according to claim 5, wherein said vibration source control means comprises an actuator control circuit; and said vibration drive source comprises a piezoelectric actuator, said piezoelectric actuator being constituted by two cantilevered bimorph structures each comprising a plurality of S-shaped driven bimorph elements.

* * * * *